US009811861B2

(12) United States Patent
Marcia

(10) Patent No.: US 9,811,861 B2
(45) Date of Patent: Nov. 7, 2017

(54) VOLUNTARY BENEFITS OUTSOURCING SYSTEMS AND METHODS

(76) Inventor: Peter Marcia, Richmond, VA (US)

( * ) Notice: Subject to any disclaimer, the term of this patent is extended or adjusted under 35 U.S.C. 154(b) by 0 days.

(21) Appl. No.: 12/872,484

(22) Filed: Aug. 31, 2010

(65) Prior Publication Data

US 2011/0055060 A1    Mar. 3, 2011

Related U.S. Application Data

(60) Provisional application No. 61/238,451, filed on Aug. 31, 2009.

(51) Int. Cl.
*G07B 17/00* (2006.01)
*G07F 19/00* (2006.01)
*G06Q 40/08* (2012.01)
*G06Q 40/00* (2012.01)

(52) U.S. Cl.
CPC .............. *G06Q 40/08* (2013.01); *G06Q 40/12* (2013.12)

(58) Field of Classification Search
None
See application file for complete search history.

(56) References Cited

U.S. PATENT DOCUMENTS

| 4,837,693 | A  * | 6/1989  | Schotz ........................... 705/4 |
| 6,401,079 | B1 * | 6/2002  | Kahn et al. ...................... 705/30 |
| 7,584,107 | B2 * | 9/2009  | Leisure et al. ................. 705/322 |
| 8,655,686 | B2 * | 2/2014  | Molinsky et al. .................. 705/4 |
| 2002/0002475 | A1 * | 1/2002  | Freedman et al. ................. 705/4 |
| 2002/0069077 | A1 * | 6/2002  | Brophy et al. .................... 705/1 |
| 2002/0147678 | A1 * | 10/2002 | Drunsic ........................ 705/39 |
| 2004/0002875 | A1 * | 1/2004  | Armstrong ...................... 705/4 |
| 2005/0288971 | A1 * | 12/2005 | Cassandra ....................... 705/4 |
| 2008/0235039 | A1 * | 9/2008  | Stoll ............................ 705/1 |
| 2009/0204441 | A1 * | 8/2009  | Read et al. ...................... 705/4 |
| 2010/0010909 | A1 * | 1/2010  | Marshall et al. ................ 705/26 |
| 2010/0179839 | A1 * | 7/2010  | Collins et al. ................... 705/4 |

* cited by examiner

*Primary Examiner* — Fateh M Obaid
(74) *Attorney, Agent, or Firm* — Troutman Sanders LLP; James E. Schutz; Andrew C. Doherty

(57) ABSTRACT

Voluntary benefits outsourcing systems and methods may be used to provide voluntary benefits to employees. An employee may choose to select any number of voluntary benefits from a menu of voluntary benefits available to that employee through the voluntary benefits system. Available voluntary benefits may include, but are not limited to, automobile insurance, homeowners insurance, life insurance, accident insurance, critical illness insurance, disability insurance, healthcare insurance, dental insurance, long term care insurance, pet care insurance and legal services insurance, discounts on computers, movie tickets, auto financing, educational testing, telephones, travel, child care, and a host of other work/life offerings, for example. The voluntary benefits systems and methods include calculating a single payroll deduction based upon the selection of the voluntary benefits by the employee. In this manner, the employee may receive a pay check with only one deduction for all selected voluntary benefits.

13 Claims, 1 Drawing Sheet

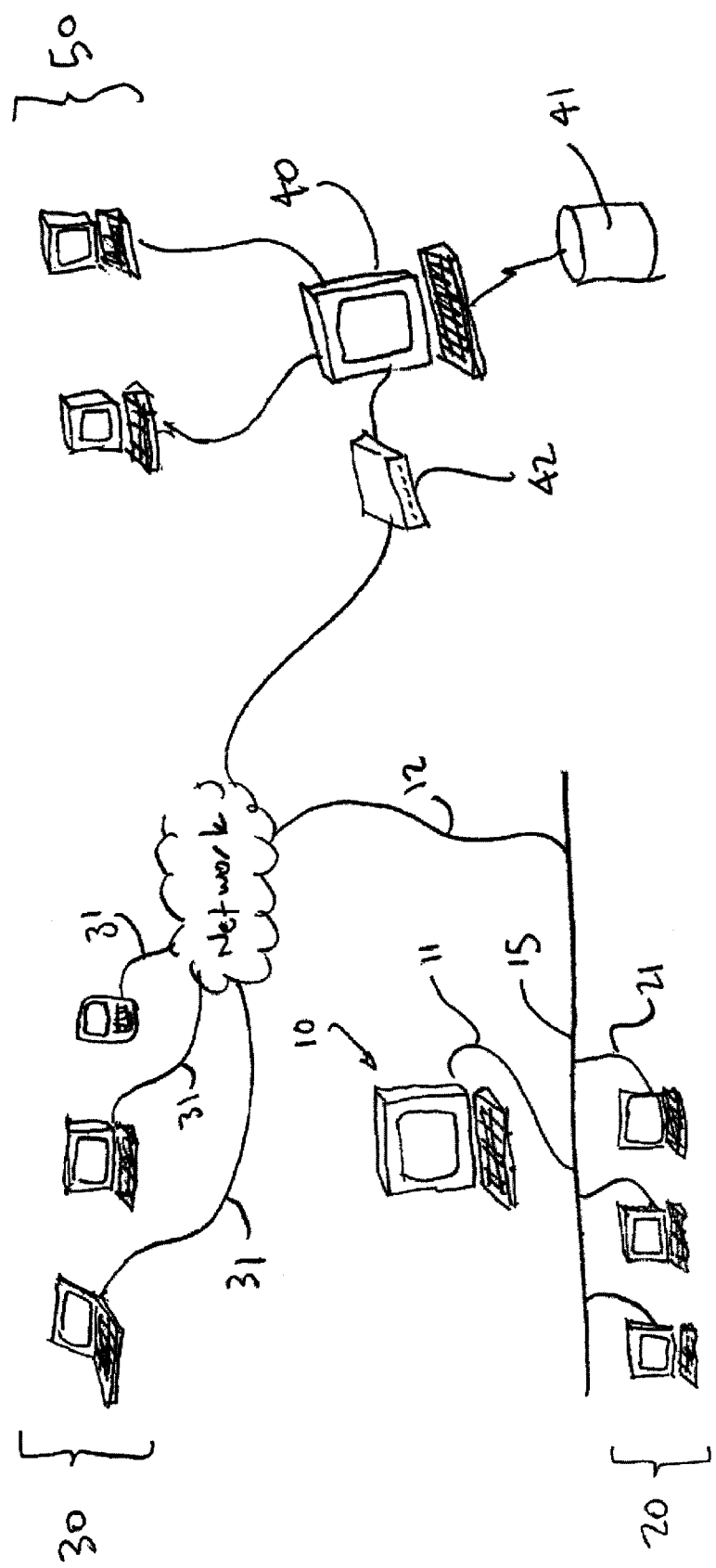

1

VOLUNTARY BENEFITS OUTSOURCING SYSTEMS AND METHODS

RELATED APPLICATIONS

This application claims priority to U.S. Provisional Patent Application No. 61/238,451 filed on Aug. 31, 2009 and is hereby incorporated by reference in its entirety.

FIELD OF THE INVENTION

Embodiments of the invention are directed to voluntary benefits outsourcing systems and methods. Embodiments of the voluntary benefits outsourcing systems and methods comprise methods of voluntary benefits outsourcing consulting, technology and management to provide employers with a plurality of benefits options for their employees. Embodiments provide employees systems and methods of distributing, communicating, selecting, enrolling, and paying for voluntary benefits.

BACKGROUND OF THE INVENTION

Some public and private employers provide a broad array of both core and voluntary benefits to employees. Such employers at times have to regularly overhaul or even eliminate traditional core benefits to decrease expenses. Employers are increasingly trying to reduce the negative impact of such benefit cuts on employees by offering an ever-growing array of voluntary benefits individually selected and often paid for by employees themselves. Such voluntary benefits are generally offered at little or no cost to employers and save employees money over similar options available to the general public. These voluntary benefits may fill some important insurance gaps or provide essential services due to cuts in traditional or core benefits programs.

Voluntary benefits programs have grown so popular that large health insurance companies are broadening their offerings to include many of these voluntary benefits. Bundled packages of benefits can cut costs for employees even further. As such, voluntary benefits programs are becoming an important enticement for employees and can help smaller companies hang on to more of their valuable employees. Many insurers are offering voluntary benefit products and packages aimed at market niches. Two of the most important such niches for small employers are part-time and hourly workers who don't qualify for traditional health benefits and new employees who may need temporary coverage while waiting for their company plan to begin.

However, management of these core and voluntary benefits programs involves an increasingly significant time and monetary burden for employers. Employers typically attempt to manage these benefits programs internally in their human resources departments as they did with the traditional or core benefits programs. Further, each employer must have a human resources department that includes employees knowledgeable about each of the benefits programs. As the number of benefits offered increases, managing these benefits becomes difficult and expensive. Thus, the cost of cutting core benefits is not fully realized.

The voluntary benefits programs may comprise a wide range of offerings including both pretax and post tax benefits. Employees receive a pay stub that includes a separate line item for each of the core and voluntary benefits that they select and must at least partially pay for. Managing payroll itself has become burdensome and is complicated by the myriad of benefits offerings.

There is a need for systems and methods of providing voluntary benefits outsourcing that is convenient and economical for employers and provides advantages for employees. There is also a need for systems and methods of providing voluntary benefits outsourcing that allows selection of a plurality of voluntary benefits to employees without significantly increasing a time and monetary burden on the employer.

SUMMARY

Embodiments of the voluntary benefits outsourcing methods and systems provide outsourcing of non-core employee benefits which organized all of an employer's voluntary insurance plans, work/life programs, and discount perks into a robust web-based solution with single-slot, payroll deduction capability. Primary revenue consists of insurance brokerage commissions embedded within insurance products purchased as Voluntary Benefits by employees. Insurance products, include but are not limited to, automobile, homeowners, life, accident, critical illness, disability, healthcare, dental, long term care, pet care and legal services. Examples of other product and service offerings include discounts on computers, movie tickets, auto financing, educational testing, telephones, travel, child care, and a host of other work/life offerings. The systems further provide a full array of services (such as consulting, communication, enrollment, customer service, billing/payroll deduction, and outsourcing) which are required to seamlessly manage/outsource comprehensive non-core benefits programs. The platform, private-labeled for each client, is accessible online to all eligible employees via single sign-on from the benefits portion of an employer's corporate intranet or via phone through their licensed call center insurance advisors.

Embodiments of the voluntary benefit system comprise of an integrated customer call center capability, single sign-on technology, a single-slot payroll deduction engine and links to the technology systems of benefits providers allowing real time quotes.

BRIEF DESCRIPTION OF THE DRAWING

FIG. 1 is a flow sheet showing the various aspects that may be included in a voluntary benefits outsourcing (VBO) system and method.

DESCRIPTION OF EMBODIMENTS

Currently, employers may provide a set of core benefits to their employees. These core benefits may include, but are not limited to, health insurance, life insurance, dental insurance, vision insurance, retirement plans, and/or 401(k) programs, for example. There is a significant expense for an employer to provide core benefits; not only the cost of the benefits themselves, but employers must also typically hire an employee or outside consulting firm to manage the relationships with each individual benefits provider and to answer questions of the employees.

In addition to core benefits, employers may additionally provide voluntary benefits or optional benefits. Such benefits may not be paid for or subsidized by the employer but these benefits may be provided to employees of the company at a discounted cost by the benefit provider. Such voluntary benefits may be used to supplement the core benefits offered to employees, voluntary discounts may include for example, discounts for amusement parks, supplemental insurance programs, computer and computer accessories, books, mortgages, flowers, movie tickets and rentals, pet care and insurance, clothing and membership to consumer clubs. Employers may wish to provide access to these additional voluntary benefits to employees but there are direct costs for providing such benefits. Providing voluntary benefits, in addition to core benefits, provide an additional burden upon benefits coordinators who need to manage and understand the scope of the benefits, communicate this information to employees and coordinate selection of the benefits. Further, payroll departments must manage all the payroll deductions from each voluntary benefits provider and reflect each employee's use of the benefits on their paycheck. The time and costs of voluntary benefits limit the number of voluntary benefits employers may make available to employees. Thus, there is trend with employers offering less core benefits and more voluntary benefits. It is anticipated that some employers may begin to offer employees only a menu of voluntary benefits that the employer will subsidize the employee's selections to a certain extent. In this way, the costs to the employer are more easily managed and the employee may select the benefits that are most valuable to them.

Embodiments of the system and method of voluntary benefits outsourcing provide a turn key solution for the implementation and management of voluntary benefits programs for employers. Embodiments of the voluntary benefits outsourcing system and method further provide a more economical means of providing additional benefits to employees. Embodiments of the method and system for providing voluntary benefits outsourcing may comprise contracting with a plurality of providers or carriers of at least one voluntary benefit and contracting with an employer to allow access to and selection of the available benefits to their employees. The system provides a communication device that allows an employee of the employer to access and select the voluntary benefits from a menu of the plurality of benefits available. The benefits may have an associated cost to the employer, to the employee, or both. If the costs are to be paid by the employee, the employee costs may be paid directly such as by check or credit card or may be paid through a single-slot payroll deduction method.

For example, a method of providing voluntary benefits outsourcing may include configuring a computer to allow an employer to select a set of available voluntary benefits for selection by their employees, to allow the employees access to the set of voluntary benefits and to select from the menu of available voluntary benefits. Further, the system may calculate a payroll deduction for each employee, and store the selections and the payroll deduction information to computer readable memory. The system and method may also include providing the selection and payroll deduction information to the employer or to the payroll service provider of the employer. The information may be communicated through a computer network.

The system for providing voluntary benefits outsourcing may be accessed by the employer and the employee through a computer network. The term "computer network" is used herein to describe a system or apparatus that enable one or more communication means to connect a user with a remote computer processing device, such a remote processing device running a voluntary benefits system. Computer networks, as described herein, can exist in both public and private networks, such as an intranet, the internet, World Wide Web, cellular networks, wireless networks, cable television networks, satellite networks, and any other public or private network, or the interconnections of such networks. As such an employee may enroll, access, and select available benefits from an employer intranet, a home computer with internet access, a portable communication device such as a cell phone, or any other suitable communication device.

The benefits included in the voluntary benefits program may include any benefit that is offered by a benefit provider and selected by the employer to be part of the employer's benefit program. In certain cases, an employer may be interested in supplementing the core benefits provided to employees by providing voluntary benefits. However, the employer may not be in a position to determine the most valuable voluntary benefits to provide to their employees. Aspects of the voluntary benefits outsourcing may comprise analyzing a database or other electronic record of employee demographics on a computer to develop employee demographic profile, performing a gap analysis on the core benefits program based upon the employee demographic profile, and comparing the gap analysis with the available voluntary benefits database to develop a strategic plan to complement the employer's core business objectives. A gap analysis is used to determine from actual employee demographic which additional benefits may actually be beneficial to the employees of a particular employer. For example, the age, race, wages, marital status, gender, as well as other characteristics may be used to determine whether day care or vision care insurance should be added as a valuable benefit to the employer's employees.

In this way, the employer may select all or a portion of the benefits offered by the voluntary benefits outsourcing system to meet the needs of their employees. The voluntary benefits may include, but are not limited to, supplemental insurance, automobile insurance, homeowners insurance, critical illness insurance, supplemental life and disability insurance, dental insurance, long term care insurance, vision care, and pet insurance, part time healthcare options, COBRA alternatives, financial services offerings, pay roll based computer purchasing, and discount purchasing programs including other goods and/or services, for example.

The method of voluntary benefits outsourcing may further comprise at least one activity selected from benefits consulting, communicating to the employees concerning the voluntary benefits available and the scope of the benefit, allowing the employees to directly enroll in the voluntary benefits system, managing the employee account, calculating a payroll deduction for the employee based upon the selection of voluntary benefits wherein the payroll deduction may be a single payroll deduction, managing the company's core benefits program, and providing information to the employer concerning employee utilization of the voluntary benefits outsourcing system wherein the information may be provided directly to the employer and/or to a payroll management service of the employer.

An embodiment of the voluntary benefits outsourcing system 40 is shown in FIG. 1. The voluntary benefits outsourcing system 40 is configured to be in communication with voluntary benefits providers systems 50 and employer's computer system, intranet, or network 15 (hereinafter "employer's network 15"). The voluntary benefits computer system 40 may comprise a computer configured to allow selection of desired voluntary benefits by employees of an employer and storing the selection of the voluntary benefits in a computer memory device 41. In order to allow benefits selection directly by the employees, the voluntary benefits outsourcing system 40 may comprise a communication device 42 connected to the system 40 capable of connecting with the employer's intranet 15 either directly or through a network. The communication device 42 allows the employees of the employer to access the voluntary benefits system 40 from the employees computers 20 connected to the employer's network 15 and/or to access the voluntary benefits system 40 from the employee's personal computer, cell phone, or other device capable of connecting to the internet. Preferably, the connections are secure connections, such as by PAP or SSL.

Further, the voluntary benefits outsourcing system 40 may be connected to a plurality of voluntary benefit provider systems 50. There may be a plurality of voluntary benefits providers that may provide access to one or more voluntary benefits. In the voluntary benefits outsourcing system, the voluntary benefits of multiple providers are centralized in a single system. A voluntary benefits provider may be a manufacturer, reseller, an insurance provider or other service provider, for example voluntary benefits may include benefits as simple as discounted pricing for products or services or may be for insurance programs not provided by in the core benefits program or to supplement the coverage of the core insurance benefits. For example, a core benefits program may include fully paid or subsidized health care insurance, life insurance, and vision care insurance. However, the core benefits do not provide an employee access to dental insurance through its core benefits program. The employer, however, may provide access to a few dental insurance plans through its voluntary benefits program. In that way, an employee may contract with dental insurance provider through the voluntary benefits system and obtain dental insurance based upon the relationship established between the voluntary benefits outsourcing system and the insurance provider. The employer may further accept a relationship with pet insurance providers, computer manufacturers, and other providers of good or services, for example. An employee may then choose between the various voluntary benefits choices to complement the core benefits. Conventionally, each voluntary benefit is recorded and deducted in its own line item on the employee's pay stub. The voluntary benefits system 40 however may calculate and communicate a single pay roll deduction for all voluntary benefits selected for each employee.

In the voluntary benefits system, the relationships with all the benefits providers are negotiated and managed through the voluntary benefits system. The voluntary benefits system may have various relationships established with various providers. The providers may have one or more benefit available. If an employer would like to easy establish a voluntary benefits program for its employees, the employer may merely contract with a voluntary benefits outsourcing system for access to the system. The employer may connect to the voluntary benefits system from the employer's intranet, for example, and select all or a portion of the voluntary benefits available from the voluntary benefits outsourcing system. The employer may create a menu of voluntary benefits available to its employees. The menu of available benefits may be different for different classes of employees such as full time employees, part time employees, interns, unionized employees, employees considered to be insiders by the Security Exchange commission, senior executives or officers, employees having compensation above a specified amount, employees at certain locations, retired employees or any desired other class of employees. For example, full time employees may have dental insurance as part of their core benefits while part time and retired employees are not provided with a dental insurance benefit. Therefore, the menu of voluntary benefits available to different classes of employees may be different. Further, highly compensated executives of the employer may be offered financial planning benefits, executive physical examinations, Chubb insurance, or other benefits targeted to high income persons, while these benefits would not be available to employees below the threshold compensation.

After establishing a menu of available benefits, employees may be registered into the voluntary benefits outsourcing system. The system maintains a database of employees associated with an employer and their individual employee class. The status of the employee may be recorded in a database on the voluntary benefits system. The employee may then access the menu of available voluntary benefits based upon the employer selections. The employee may then select the desired voluntary benefits.

The voluntary benefits system may record the selection of voluntary benefits into the database, request any additional information, and calculate a cost, if any, to the employee. The cost may be consolidated and communicated to the employer or a payroll management system as a single slot line item on the employee's pay stub. Other voluntary benefits systems do not consolidate the payroll deduction into a single line item and each provider is managed through a separate slot. This multi-slot system creates accounting costs for the employer. Embodiments of the voluntary benefits system may comprise a database for storing the employee's selections and calculating a single payroll deduction based upon the selection of the voluntary benefits by the employee. Such a voluntary benefits system allows for decreased cost to employers and ease of selection for the employee.

Embodiments of the voluntary benefits outsourcing system may further include a computer storage medium comprising computer executable instructions for performing a method of providing voluntary benefits outsourcing may comprise the following steps and/or other steps described above: allowing access and selection of voluntary benefits by employees of a employer, storing the selection of the voluntary benefits in a computer memory device, calculating a single payroll deduction based upon the selection of the voluntary benefits by the employee, storing the selection of the single payroll deduction in a computer memory device, and communicating the single payroll deduction to the employer or payroll management company or system. Embodiments of the voluntary benefits outsourcing system and method allow secure access to a web site through a computer network.

Embodiments of the voluntary benefits outsourcing methods and systems comprise a streamlined consulting approach allowing human resource managers of employers to create customized voluntary benefits programs. The customized benefits programs may be designed to complement existing core health and welfare programs available to employees. Embodiments of the benefits outsourcing system and method may comprise any benefits management activity such as, but not limited to, analyzing and strategizing to achieve strategic human resource management objectives; analyzing employee demographics and perform core program gap analysis; developing strategic plans to complement core business objectives; and integrating and implementing specific benefits programs; advising on a best fit selection of different insurers/vendors to provide voluntary benefits; coordinating implementation activities of new benefits programs; communicating and educating employees concerning the program; extending customized ongoing employee communication; providing employees with web-based decision-making tools and content; monitoring and managing benefits program vendors and mediating employee issues with the benefits program vendors; or a combination thereof. The benefits programs may include a "one size" fits all program or individual benefits programs may be created for diverse group demographics such as, but not limited to, full time employees, part time employees, interns, unionized employees, employees considered to be insiders by the Security Exchange commission, senior executives or officers, employees having compensation above a specified amount, employees at certain locations, retired employees or any desired other class of employees.

Embodiments of the voluntary benefits outsourcing systems and methods provide both public and private employers a convenient and cost effective means of providing additional benefits to employees. Embodiments of the voluntary benefits outsourcing may further comprise providing human resource business intelligence tools such as a computerized method to measure employee engagement with the plurality of voluntary benefits and/or benefits program evaluation and measurement tools and assistance. The voluntary benefits outsourcing systems and methods comprise the ability to provide a single slot payroll deduction for each employee of an employer for a wide range of products and services. A single slot payroll deduction simplifies and reduces costs for a human resources department with the ability to provide fully integrated single slot payroll deduction across a wide range of products and services. The computer technology for single slot payroll deduction enables consolidation of premiums from multiple products and insurers into a single payroll slot. The single slot payroll deduction capability is a rules-based system, providing accurate and timely payroll collection and reconciliation services with only one deduction file for the employer or large organization to manage. This saves significant time and money for the employer. If payroll deduction is not a feasible option, many products are still available though direct billed arrangements, but choices may be limited.

Embodiments of the voluntary benefits outsourcing systems and methods may comprise unique offerings by demographic, geographic, program eligibility, or employment status by group or by an individual. For example, "Life Events" component to improve the user experience and enhance benefit decisions. The system may provide advice to an employee for selection of available voluntary benefits that may be appropriate after an upcoming marriage or birth of a child. Further, the voluntary benefits outsourcing systems and methods may comprise grouping and suggesting the additional benefits, products and articles appropriate based upon the employee's age, family situation, income, gender, other voluntary benefits selections, for example. Grouping by employee status and suggesting additional voluntary benefits, products, and articles make it easier for each employee to tailor a benefits program to their present employee needs. Embodiments of the voluntary benefits program may comprise benefit channels and may be driven by a Really Simple Syndication (RSS) engine to deliver content directly to corporate Intranets as applicable. Such robust corporate communications capabilities, including customizable materials in electronic and print format assist human resources in keeping employees by providing and alerting them to the advantages of employment.

Outsourcing of voluntary benefits potentially provides an employer the ability to have a much wider array of available benefits to their employees at a reduced cost. Outsourcing provides the advantages of improved access to information and selections through direct web site design and navigation, more robust corporate communications capabilities, including customizable materials in electronic and print format and a single-destination portal for communication of group voluntary benefits, non-insurance consumer products and financial services offerings to employees and members.

Other aspects and features of embodiments of the present invention will become apparent to those of ordinary skill in the art, upon reviewing the following description of exemplary embodiments of the invention in conjunction with the accompanying figures. While features of the invention may be discussed relative to certain embodiments and figures, all embodiments of the present invention can include one or more of the advantageous features discussed herein. In other words, while one or more embodiments may be discussed as having certain advantageous features, one or more of such features may also be used in accordance with the various embodiments of the invention discussed herein. In addition, while discussion contained herein may, at times, focus on voluntary benefits, embodiments of the invention can also be used in other settings. In similar fashion, while exemplary embodiments may be discussed below as system or method embodiments it is to be understood that such exemplary embodiments can be implemented in various systems, and methods.

The invention claimed is:

1. A method for providing voluntary benefits outsourcing, comprising:
   receiving, by a voluntary benefits outsourcing system server, data representative of a plurality of voluntary benefits, wherein the plurality of voluntary benefits comprise different categories of voluntary benefits offered by one or more benefits providers;
   establishing a secure communication link between the voluntary benefits outsourcing system server and an employer's network to allow access, through a computer network and by an employee of the employer, to at least a portion of the plurality of voluntary benefits, wherein the employee is characterized by an employee classification, and wherein the at least a portion of the plurality of voluntary benefits accessible by the employee is based at least in part on the employee's employee classification;
   receiving, by the voluntary benefits outsourcing system server, an indication of a selection of a group of voluntary benefits from the at least a portion of the plurality of voluntary benefits accessible by the employee, wherein the selected group of voluntary benefits from the at least a portion of the plurality of voluntary benefits accessible by the employee is selected by the employee from a menu listing the at least a portion of the plurality of voluntary benefits accessible by the employee;
   recording, by the voluntary benefits outsourcing system server and in a computer database associated with the voluntary benefits outsourcing system server, the selected group of voluntary benefits;
   calculating, by the voluntary benefits outsourcing system server, a sum total cost of the selected group of voluntary benefits; and
   communicating, by the voluntary benefits outsourcing system server and to a payroll management system, the sum total as a single slot payroll deduction for the employee.

2. The method of claim 1, wherein the categories of voluntary benefits comprise homeowners insurance, critical illness insurance, supplemental life and disability insurance, voluntary dental insurance, dental insurance, long term care insurance, vision care, pet insurance, part time healthcare options, COBRA alternatives, financial services offerings, pay roll based computer purchasing, and discount purchasing programs.

3. The method of claim 1, further comprising receiving, by the voluntary benefits outsourcing system server and from the employer's network, employee demographic information relating to employees of the employer.

4. The method of claim 3, further comprising:
analyzing, by the voluntary benefits outsourcing system server, employee demographics; and
performing, by the voluntary benefits outsourcing system server, core benefits gap analysis.

5. The method of claim 4, further comprising responsive to analyzing employee demographics and performing core benefits gap analysis, identifying, by the voluntary benefits outsourcing system server, voluntary benefits to complement the employer's core benefits.

6. The method of claim 1, further comprising:
communicating, by the voluntary benefits outsourcing system server and to an employee concerning the voluntary benefits.

7. The method of claim 1, wherein the employee classification is selected from the group consisting of full time employees, part time employees, interns, unionized employees, employees considered to be insiders by the Security Exchange commission, senior executives or officers, employees having compensation above a specified amount, employees at certain locations, and retired employees.

8. The method of claim 1, wherein the employer is a first employer and the method further comprises establishing a communication link between the voluntary benefits outsourcing system server and a second employer's network.

9. The method of claim 8, wherein the first employer and the second employer provide a different set of voluntary benefits to their employees.

10. The method of claim 1, further comprising receiving, by the voluntary benefits outsourcing system server, data representative of one or more core benefits.

11. A method, comprising:
receiving, by a voluntary benefits outsourcing system server, data representative of a plurality of available voluntary benefits, wherein the plurality of available voluntary benefits comprise different categories of voluntary benefits offered by a plurality of benefits providers;
outputting, by the voluntary benefits system server and for display to an employer, the data representative of a plurality of available voluntary benefits provided by the plurality of benefits providers, wherein each of the plurality of available voluntary benefits has an associated cost;
receiving, at the voluntary benefits system server, an indication of selection of a plurality of offered voluntary benefits, wherein the plurality of offered voluntary benefits is a subset of the plurality of available voluntary benefits and represents the employer's selection of voluntary benefits to offer its employees;
outputting, by the voluntary benefits system server and for display to an employee of the employer, data representative of the plurality of offered voluntary benefits, wherein the data representative of the plurality of offered voluntary benefits is displayed in a menu of selectable items;
receiving, at the voluntary benefits system server and via a secure connection, an indication of the employee's selection of a plurality of selected voluntary benefits, wherein the plurality of selected voluntary benefits is a subset of the plurality of offered voluntary benefits and represents the employee's selection of voluntary benefits in which to enroll;
calculating, by the voluntary benefits system server, a sum total cost of the plurality of selected voluntary benefits using the respective associated cost of each voluntary benefit; and
outputting, by the voluntary benefits system server, and to a payroll management system, the sum total cost of the plurality of selected voluntary benefits, wherein the sum total cost of the plurality of selected voluntary benefits represents a single slot payroll deduction.

12. The method of claim 11, wherein the categories of the plurality of available voluntary benefits include automobile insurance, homeowners insurance, critical illness insurance, supplemental life and disability insurance, voluntary dental insurance, dental insurance, long term care insurance, vision care, pet insurance, part time healthcare options, COBRA alternatives, financial services offerings, pay roll based computer purchasing, and discount purchasing programs.

13. The method of claim 11, wherein the outputting data representative of the plurality of offered voluntary benefits further comprises:
outputting, to a first employee associated with a first classification of employees, a first subset of the plurality of offered voluntary benefits; and
outputting, to a second employee associated with a second classification of employees, a second subset of the plurality of offered voluntary benefits.

* * * * *